J. ARTHUR.
Globe-Valves.

No. 157,112.　　　　　　　　　Patented Nov. 24, 1874.

Witnesses
Chas. H. Smith
Geo. T. Pinckney

Inventor
James Arthur
per Lemuel W. Perrell
atty.

UNITED STATES PATENT OFFICE.

JAMES ARTHUR, OF JERSEY CITY, ASSIGNOR TO ADAM CARR, OF PATERSON, NEW JERSEY.

IMPROVEMENT IN GLOBE-VALVES.

Specification forming part of Letters Patent No. 157,112, dated November 24, 1874; application filed October 17, 1874.

*To all whom it may concern:*

Be it known that I, JAMES ARTHUR, of Jersey City, in the State of New Jersey, have invented an Improvement in Globe-Valves, of which the following is a specification:

Before my invention a nut had been provided with wings and introduced into the cap of the globe-valve; but it required to be held by a separate collar or segment, that was liable to be lost when the cock was unscrewed and the parts positioned for grinding the cock.

My invention is made for simplifying the construction of the cock and dispensing with any separate piece. I make the wings upon the nut to extend to the screw of the cap, and upon the ends of the wings the screw-thread is cut, as well as upon the other portion of the bottom of the cap. Thereby the screw-nut will be held up by the threads at the ends of the wings when screwed into the socket of the globe-valve; but, when the nut and wings are moved out of the recess and screwed on the spindle toward the valve, the parts can be inserted, and the valve and nut will be below the screw of the socket, and hence they can be rotated in grinding the valve to its seat.

Figure 1:
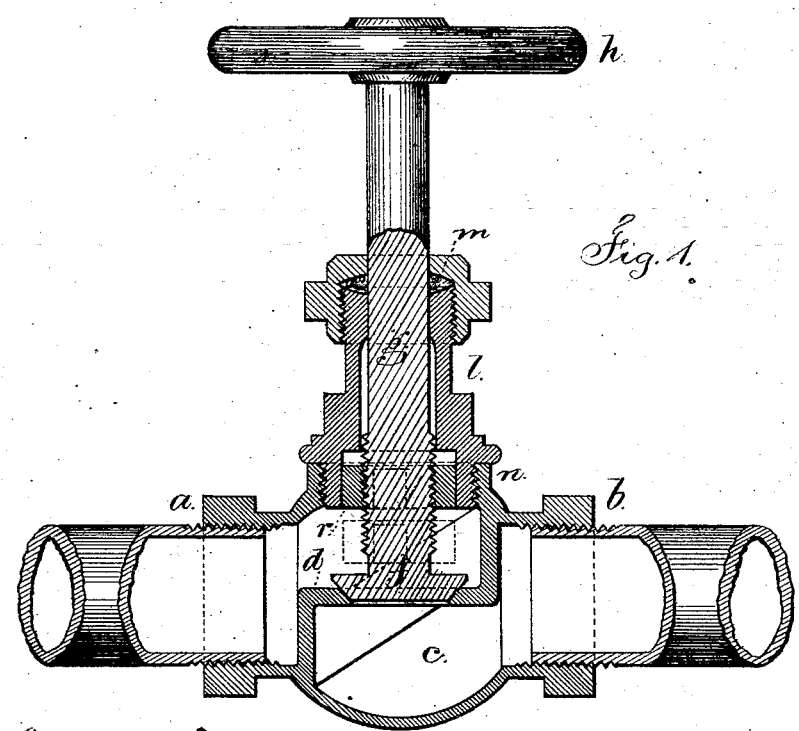
Figure 3:
Figure 4:
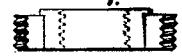
Figure 2:
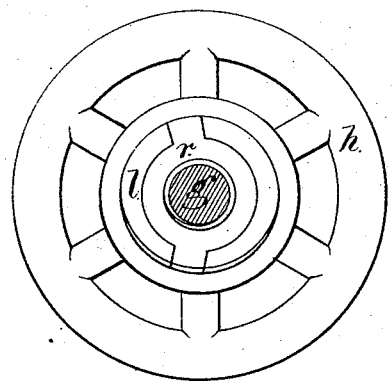

In the drawing, Figure 1 is a vertical section of the globe-valve complete. Fig. 2 is an inverted plan of the nut and cap. Figs. 3 and 4 are side views of the nut and wings.

The coupling-screws $a$ $b$ are at the ends of the globular body $c$, in which is the division and valve-seat $d$. The valve $f$ and stem $g$ are provided with the hand-wheel $h$, as usual; and the cap $l$ is made with a gland, $m$, and screws into the socket $n$ upon the body $c$.

The screw portion of the cap is notched, preferably at opposite sides, or nearly so, and the nut $r$ is made with wings that fill these notches. These notches should be either one slightly wider than the other or not quite opposite, as shown, so that the wings of the nut can only go into the notches for which they are intended; and around the screw-cap the screw-thread is cut to fit the socket $n$; hence the ends of the wings have screw-threads upon them, as seen in Figs. 3 and 4.

When the valve is to be ground to the seat the cap $l$ is removed from the socket $n$, the nut $r$ pushed out and run down toward the valve, and the nut and valve are put in sidewise through the socket, turned to place, and the socket screwed in again. The nut, occupying the position shown by dotted lines in Fig. 1, is inoperative, and the valve and nut can be turned by the stem and hand-wheel in grinding the valve to its seat.

I claim as my invention—

The nut $r$, having wings that occupy notches in the screw portion of the cap $l$, and in the ends of which the screw-threads are formed, in combination with the globe-valve, as and for the purposes set forth.

Signed by me this 14th day of October, A. D. 1874.

JAS. ARTHUR.

Witnesses:
GEO. T. PINCKNEY,
CHAS. H. SMITH.